United States Patent
Frank et al.

(10) Patent No.: US 8,770,139 B2
(45) Date of Patent: Jul. 8, 2014

(54) APPARATUS FOR FEEDING CEMENTITIOUS SLURRY ONTO A MOVING WEB

(75) Inventors: William A. Frank, Lake Villa, IL (US); Alfredas Blyskis, Oak Lawn, IL (US)

(73) Assignee: United States Gypsum Company, Chicago, IL (US)

(*) Notice: Subject to any disclaimer, the term of this patent is extended or adjusted under 35 U.S.C. 154(b) by 1118 days.

(21) Appl. No.: 12/397,189

(22) Filed: Mar. 3, 2009

(65) Prior Publication Data

US 2010/0227073 A1 Sep. 9, 2010

(51) Int. Cl.
*B05B 5/00* (2006.01)
*B22F 3/08* (2006.01)
*B05C 5/00* (2006.01)
*B05C 5/02* (2006.01)
B05D 1/30 (2006.01)
B28B 1/00 (2006.01)
B07B 1/00 (2006.01)
B28B 13/02 (2006.01)

(52) U.S. Cl.
CPC ............ *B05C 5/005* (2013.01); *B05C 5/0245* (2013.01); *B28B 2013/0265* (2013.01); *B28B 2013/024* (2013.01); *Y10S 118/04* (2013.01)
USPC ...... 118/323; 118/429; 118/DIG. 4; 118/421; 118/415; 118/324; 427/420; 162/341; 264/84; 264/251; 264/206; 264/71; 425/60; 425/64; 425/261; 425/456; 209/233; 209/477

(58) Field of Classification Search
USPC ............ 427/420; 118/324; 425/224; 162/341
See application file for complete search history.

(56) References Cited

U.S. PATENT DOCUMENTS

| 2,763,894 | A | | 9/1956 | Bulkley et al. |
| 2,950,660 | A | * | 8/1960 | Standfuss ...................... 404/108 |
| 3,059,772 | A | * | 10/1962 | Le Baron ................... 209/127.1 |
| 3,205,089 | A | | 9/1965 | Kinzelman |
| 3,360,392 | A | | 12/1967 | Mod et al. |
| 3,368,936 | A | | 2/1968 | De Long |
| 3,562,108 | A | | 2/1971 | Lopas |
| 3,570,670 | A | * | 3/1971 | Endo et al. ..................... 210/112 |
| 4,165,211 | A | | 8/1979 | Ebeling et al. |
| 4,193,750 | A | * | 3/1980 | Nielson ........................... 425/60 |

(Continued)

FOREIGN PATENT DOCUMENTS

JP 2001212815 8/2001
WO 93/25778 A1 12/1993

*Primary Examiner* — Dah-Wei D Yuan
*Assistant Examiner* — Karl Kurple
(74) *Attorney, Agent, or Firm* — Novak Druce Connolly + Quigg, LLP; Pradip Sahu; Philip T. Petti (57) ABSTRACT

An apparatus and process for depositing slurry upon a moving forming web. The apparatus includes a pivotally mounted headbox for depositing slurry from the inner bottom surface of the headbox down an inclined spillway as a continuous curtain onto a moving web. The headbox is mounted transverse to the direction of travel of the moving web. The headbox also has vertical edge boards, including a headbox back edge board and two opposed headbox side edgeboards, on three respective sides of the headbox to prevent slurry from spilling over the sides and back of the headbox. The headbox is supplied with slurry from a slurry mixer by a feed line mounted on a reciprocating trolley which moves, transverse to the direction of travel of the moving web, back and forth along the length of the headbox.

8 Claims, 6 Drawing Sheets

(56) References Cited

U.S. PATENT DOCUMENTS

| | | |
|---|---|---|
| 4,216,181 A | 8/1980 | Ebeling et al. |
| 4,294,657 A | 10/1981 | Saito et al. |
| 4,354,902 A | 10/1982 | Attwood |
| 4,377,230 A * | 3/1983 | Burkner ............... 198/525 |
| 4,420,295 A | 12/1983 | Clear et al. |
| 4,420,371 A | 12/1983 | Dahl et al. |
| 4,426,289 A | 1/1984 | Svehaug |
| 4,427,722 A | 1/1984 | Keller |
| 4,428,775 A | 1/1984 | Johnson |
| 4,466,993 A | 8/1984 | Hsu et al. |
| 4,479,987 A | 10/1984 | Koepke et al. |
| 4,504,335 A | 3/1985 | Galer |
| 4,543,159 A | 9/1985 | Johnson et al. |
| 5,074,435 A * | 12/1991 | Suverkrop et al. ............. 222/55 |
| 5,685,903 A | 11/1997 | Stav et al. |
| 5,858,083 A | 1/1999 | Stav et al. |
| 5,885,660 A | 3/1999 | Ruschak |
| 5,958,131 A | 9/1999 | Asbridge et al. |
| 6,176,920 B1 | 1/2001 | Murphy et al. |
| 6,248,214 B1 | 6/2001 | Stotz et al. |
| 6,261,418 B1 | 7/2001 | Stotz et al. |
| 6,605,186 B2 | 8/2003 | Miller |
| 6,620,487 B1 | 9/2003 | Tonyan et al. |
| 6,824,715 B2 | 11/2004 | Cottier et al. |
| 6,986,812 B2 | 1/2006 | Dubey et al. |
| 7,140,869 B2 * | 11/2006 | Toncelli ............. 425/449 |
| 7,384,437 B2 * | 6/2008 | Welygan et al. ............. 51/307 |
| 2003/0132140 A1 * | 7/2003 | Oder et al. ............. 209/218 |
| 2005/0064055 A1 | 3/2005 | Porter |
| 2005/0064164 A1 | 3/2005 | Dubey et al. |
| 2006/0144005 A1 | 7/2006 | Tonyan et al. |
| 2006/0168905 A1 | 8/2006 | Blanc et al. |
| 2006/0174572 A1 | 8/2006 | Tonyan et al. |
| 2006/0185267 A1 | 8/2006 | Tonyan et al. |
| 2007/0095495 A1 | 5/2007 | Reuter |
| 2007/0110838 A1 | 5/2007 | Porter et al. |
| 2007/0110970 A1 * | 5/2007 | Dubey ............. 428/212 |
| 2008/0099133 A1 | 5/2008 | Stivender |
| 2008/0099171 A1 | 5/2008 | Frank et al. |
| 2008/0101150 A1 | 5/2008 | George et al. |
| 2008/0101151 A1 | 5/2008 | Frank et al. |
| 2008/0178260 A1 | 7/2008 | Schwarz et al. |

* cited by examiner

(Prior Art)

APPARATUS FOR FEEDING CEMENTITIOUS SLURRY ONTO A MOVING WEB

FIELD OF THE INVENTION

This invention relates to a continuous process and related apparatus for producing structural panels using settable slurry, and more specifically, to an improved slurry feeder headbox apparatus used in the manufacture of reinforced cementitious panels, referred to herein as structural cement panels (SCP), in which fibers are combined with quick-setting slurry for providing flexural strength.

BACKGROUND OF THE INVENTION

Cementitious panels have been used in the construction industry to form the interior and exterior walls of residential and/or commercial structures. The advantages of such panels include resistance to moisture compared to standard gypsum-based wallboard. However, a drawback of such conventional panels is that they do not have sufficient structural strength to the extent that such panels may be comparable to, if not stronger than, structural plywood or oriented strand board (OSB).

Typically, the cementitious panel includes at least one hardened cement composite layer between layers of a reinforcing or stabilizing material. In some instances, the reinforcing or stabilizing material is fiberglass mesh or the equivalent. The mesh is usually applied from a roll in sheet fashion upon or between layers of settable slurry. Examples of production techniques used in conventional cementitious panels are provided in U.S. Pat. Nos. 4,420,295; 4,504,335 and 6,176,920, the contents of which are incorporated by reference herein. Further, other gypsum-cement compositions are disclosed generally in U.S. Pat. Nos. 5,685,903; 5,858,083 and 5,958,131.

U.S. Pat. No. 6,620,487 to Tonyan, which is incorporated herein by reference in its entirety, discloses a reinforced, lightweight, dimensionally stable panel capable of resisting shear loads when fastened to framing equal to or exceeding shear loads provided by plywood or oriented strand board panels. The panels employ a core of a continuous phase resulting from the curing of an aqueous mixture of calcium sulfate alpha hemihydrate, hydraulic cement, an active pozzolan and lime, the continuous phase being reinforced with alkali-resistant glass fibers and containing ceramic microspheres, or a blend of ceramic and polymer microspheres, or being formed from an aqueous mixture having a weight ratio of water-to-reactive powder of 0.6/1 to 0.7/1 or a combination thereof. At least one outer surface of the panels may include a cured continuous phase reinforced with glass fibers and containing sufficient polymer spheres to improve nailability or made with a water-to-reactive powders ratio to provide an effect similar to polymer spheres, or a combination thereof.

US Patent Application Publication No. 2005/0064055 to Porter, application Ser. No. 10/665,541, which is incorporated herein by reference in its entirety, discloses an embedment device for use in a structural panel production line wherein a slurry is transported on a moving carrier relative to a support frame, and chopped fibers are deposited upon the slurry, includes a first elongate shaft secured to the support frame and having a first plurality of axially spaced disks, a second elongate shaft secured to the support frame and having a second plurality of axially spaced disks, the first shaft being disposed relative to the second shaft so that the disks intermesh with each other. The intermeshing relationship enhances embedment of the fibers into the slurry and also prevents clogging of the device by prematurely set slurry particles.

US Patent Application Publication No. 2005/0064164 to Dubey et al., application Ser. No. 10/666,294, incorporated herein by reference in its entirety, discloses a multi-layer process for producing structural cementitious panel which includes: (a.) providing a moving web; (b.) one of (I) depositing a first layer of individual, loose fibers upon the web, followed by depositing a layer of settable slurry upon the web and (ii) depositing a layer of settable slurry upon the web; (c.) depositing a second layer of individual, loose fibers upon the slurry; (d.) actively embedding said second layer of individual, loose fibers into the slurry to distribute said fibers throughout the slurry; and (e.) repeating steps (ii) through (d.) until the desired number of layers of settable fiber-enhanced slurry is obtained and so that the fibers are distributed throughout the panel. Also provided are a structural panel produced by the process, an apparatus suitable for producing structural cementitious panels according to the process, and a structural cementitious panel having multiple layers, each layer created by depositing a layer of settable slurry upon a moving web, depositing fibers upon the slurry and embedding the fibers into the slurry such that each layer is integrally formed with the adjacent layers.

U.S. Pat. No. 6,986,812 of Dubey et al., incorporated herein by reference in its entirety, features a slurry feed apparatus for use in a SCP panel production line or the like application where settable slurries are used in the production of building panels or board. The apparatus includes a main metering roll and a companion roll placed in close, generally parallel relationship to each other to form a nip in which a supply of slurry is retained. Both rolls preferably rotate in the same direction so that slurry is drawn from the nip over the metering roll to be deposited upon a moving web of the SCP panel production line. A thickness control roll is provided in close operational proximity to the main metering roll for maintaining a desired thickness of the slurry.

U.S. Patent Application Publication No. 2006/0174572 to Tonyan et al., incorporated herein by reference in its entirety, discloses non-combustible SCP panel metal frame systems for shear walls.

U.S. Pat. No. 6,248,214 to Stotz et al. disclose a pivot headbox for a paper machine. See column 7, lines 14-46 referring to FIG. 2, axis 24a provided in the area of the nozzle end or stream outlet 15 so that a corresponding nozzle stream angle change. The Stotz headbox, which is more similar to an extrusion device than an open headbox, uses a cylinder underneath the headbox (item 12) to control the angle of tilt and is very limited in adjustment of the angle of tilt compared to the degree of adjustment with a simple lever on the pivot shaft of the headbox used in the present invention.

U.S. Pat. No. 4,479,987 to Koepke et al. discloses a free-falling liquid curtain 4 which is laterally guided by two sheets of material through a very restricted area defined by curtain holders 9 which are vertically arranged (col. 6, lines 58-59). The arrangement would not be operable with a cement slurry which contains lumps and chips and which is fast setting. This arrangement would cause plugging of the area between the curtains, resulting in a broken curtain of slurry deposited on the web. The ability of the vertical curtains to pivot without the curtain tearing is largely through use of an auxiliary liquid delivered through a supply pipe, 10. This which would be impractical with an aggressive setting cement slurry which is used in the present invention.

U.S. Pat. No. 4,420,371 to Dahl et al. discloses a pivoting paper headbox apparatus which uses a captive shaft through a typical bearing or other means of pivot that is actuated by a jack or cylinder at the rear of the machine, compared to the single hand operated lever attached to the pivot shaft in the present invention. The pivot shaft in the present invention is set into a yoke which only allows up and down movement for easy removal of the device from the line but does not permit the device to move in the direction of the conveyor belt. The headbox in Dahl is also designed to isolate the headbox from vibration from adjacent equipment, rather than being designed to vibrate the headbox to maintain the flow and distribution of the slurry in the headbox of the present invention.

U.S. Pat. No. 4,165,211 to Ebeling et al. discloses an apparatus for applying a layer of liquid foamable reaction mixture to a continuously moving support. According to one particular embodiment, the distributor channel is adapted to pivot about an axis extending transversely to the conveyor belt (col. 2, lines 53-58). This pivoting action enables the volume in the distributor channel and hence the time of intermediate storage of the reaction mixture in the channel to be controlled (See FIG. 1, and column 3, lines 31-47). The Ebeling device would allow heavy cement particles to eventually settle out, filling the bottom radius of the headbox right up to the discharge lip. The present invention uses a combination of vibration and headbox angle control the discharge flow pattern of the headbox. The angle of tilt is used to ensure material is consistently discharged from the headbox to ensure a curtain is maintained. The pivot on the present headbox is placed so as to minimize the change in distance between spillway lip and the product being formed compared to the Ebeling device in which the pivot is placed in the approximate center of the headbox. The pivoting action of the Ebeling device appears to be limited to controlling flow of the device and would not allow for immediate dumping of headbox contents on the belt as in the present invention.

U.S. Pat. No. 3,360,392 to Mod et al. discloses a reservoir 38 and spout 39 (FIG. 2 and column 2, lines 63-70). The headbox in Mod does not provide for pivoting of the headbox or for vibration of the headbox to maintain the flow and distribution of a slurry in the headbox to provide depositing of a continuous curtain of slurry on the web, as in the present invention.

In preparing the SCP panels, an important step is feeding cementitious slurry to the production line. There is a desire for improved slurry feeing devices to increase production speed and reduce downtime.

There is also a desire for an improved process and/or a related apparatus for producing fiber-reinforced cementitious panels which results in a board with structural properties comparable to structural plywood and OSB which reduces production line downtime. There is also a desire for a process and/or a related apparatus for producing such structural cementitious panels which more efficiently uses component materials to reduce production costs over conventional production processes.

Furthermore, the above-described cementitious structural panels, also referred to as SCP's, are preferably configured to behave in the construction environment similar to plywood and OSB. Thus, the SCP panels are preferably nailable and can be cut or worked using conventional saws and other conventional carpentry tools. Further, the SCP panels should meet building code standards for shear resistance, load capacity, water-induced expansion and resistance to combustion, as measured by recognized tests, such as ASTM E72, ASTM 661, ASTM C 1185 and ASTM E136 or equivalent, as applied to structural plywood sheets.

The improvements noted in co-pending U.S. Patent Application Publication No. 2008/0099171 A1, allowed for a headbox that would provide a robust and continuous slurry. However, certain problems and deficiencies associated with this technology include numerous electrical controls (2 motors and 2 limit switches), a large footprint of about 3 linear feet on the line, which obscures physical and visual access to the forming area (which can allow flaws to go undetected for longer periods of time), slurry leakage at the ends of the rolls and between the roils (due to wear and inability to provide for robust sealing methods), inadequate stirring and movement of the slurry within the headbox with use of the rotating rolls to move slurry in the headbox, difficult cleaning due to materials used and complexity of the headbox which leads to high fabrication cost.

SUMMARY OF THE INVENTION

The present invention fulfills the same objective as the old slurry headbox, namely providing a robust slurry curtain across the width of the product being formed The invention at hand accomplishes this with no motors or limit switches, a foot print of about 1.5 linear feet, greatly increased physical and visual access to the forming area, increased stirring of the slurry in the headbox with use of the force of delivery of the slurry to the headbox, easier cleaning and absolute elimination of slurry leakage at about 10% the cost of the original design.

The present invention provides the user with the ability to quickly change the angle of the headbox (if necessary) while maintaining the tip-to-product distance (typically the tip-to-product distance should be about 1" to maintain a robust unbroken curtain).

The present invention also provides the user with the ability to immediately dump the slurry in case of line shutdown by tilting of the headbox with the use of a simple lever on one of the pivot bars on the side wall of the headbox and to immediate remove the headbox from the open yoke supports for the pivot bars on each side of the production line without tools.

The present invention is made of metal, typically stainless steel, has simple sideboards formed or mechanically attached and vibration may be applied to the whole headbox using widely available vibrators (pneumatic or electric). The vibration ensures even flow of cement slurry out of the headbox and helps minimize buildup of pre-set cement on the side walls and bottom of the headbox.

Advantageously the headbox of this invention is easy to move and clean; contains minimal moving parts; is very durable; is physically much smaller than existing devices, so it provides much needed physical and visual access to the area around the headbox; and is much lower in cost compared to existing headbox devices.

The present invention features a slurry feed apparatus (typically known as a "headbox") for use in depositing slurry on a moving web of a structural cementitious panel (SCP panel) production line or the like where settable slurries are used for producing fiber reinforced building panels or board.

The slurry feed apparatus uses a slurry supply hose mounted on a moving trolley which moves back and forth along the length of the headbox to provide the slurry with the needed force to constantly stir and move the slurry within the headbox as it passes over the spillway on the forming web. This simplified design avoids the need for rotating rolls including a main metering roll and a companion roll placed in close, generally parallel relationship to each other in the headbox and positioned generally transversely to the direction of travel of the web, to stir the slurry and move the slurry from the headbox to the forming web. This simplified design also eliminates the need for a drive system in the headbox for driving the metering roll and the companion roll in the same direction.

The headbox is equipped with a vibrator typically attached to the back wall of the headbox and run by a hydraulic line, to impart vibration to the walls of the headbox. This assists in avoiding buildup of slurry at the ends of the headbox and premature setting of the slurry in the headbox.

The process of the present invention provides a cementitious slurry with improved fluidity through use of a vibrator to impart shear forces to the slurry in the headbox. This assists in obtaining uniform deposition of slurries on moving web without premature setting over a wider range of cement and water slurries with a greater range of water to cement solids. The present invention advantageously avoids significant build-up of slurry setting up in the corners of the headbox.

Typically the slurry feeder is employed in a multi-layer process for producing structural cementitious panels (SCP's or SCP panels), and SCP's produced by such a process. After one of an initial deposition of loosely distributed, chopped fibers or a layer of slurry upon a moving web, fibers are deposited upon the slurry layer. An embedment device thoroughly mixes the recently deposited fibers into the slurry so the fibers are distributed throughout the slurry, after which additional layers of slurry, then chopped fibers are added, followed by more embedment. The process is repeated for each layer of the panel, as desired. Upon completion, the board has a more evenly distributed fiber component, which results in relatively strong panels without the need for thick mats of reinforcing fibers, as are taught in prior art production techniques for cementitious panels.

DETAILED DESCRIPTION OF THE INVENTION

Figure 1:
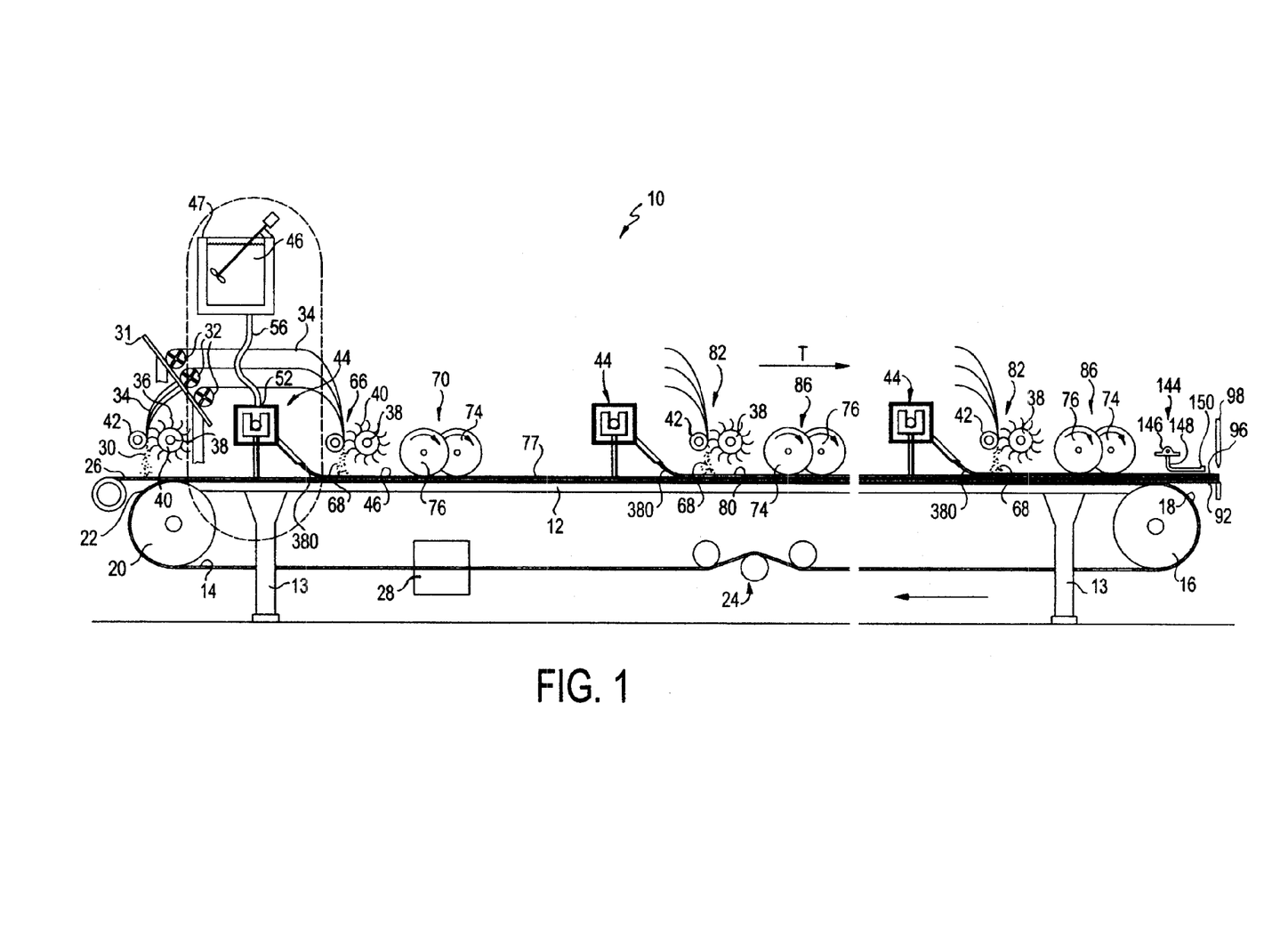
FIG. 1 is a diagrammatic elevation view of an SCP panel production line suitable for use with the present slurry headbox.

Referring now to FIG. 1, a structural panel production line is diagrammatically shown and is generally designated 10. The production line 10 includes a support frame or forming table 12 having a plurality of legs 13 or other supports. Included on the support frame 12 is a moving carrier 14, such as an endless rubber-like conveyor belt with a smooth, water-impervious surface, however porous surfaces are contemplated. As is well known in the art, the support frame 12 may be made of at least one table-like segment, which may include designated legs 13 or other support structure. The support frame 12 also includes a main drive roll 16 at a distal end 18 of the frame, and an idler roll 20 at a proximal end 22 of the frame. Also, at least one belt tracking and/or tensioning device 24 is typically provided for maintaining a desired tension and positioning of the carrier 14 upon the rolls 16, 20. In this embodiment, the SCP panels are produced continuously as the moving carrier proceeds in a direction "T" from the proximal end 22 to the distal end 18.

In this embodiment, a web 26 of Kraft paper, release paper, or a plastic carrier, for supporting a slurry prior to setting, may be provided and laid upon the carrier 14 to protect it and/or keep it clean.

However, it is also contemplated that, rather than the continuous web 26, individual sheets (not shown) of a relatively rigid material, e.g., sheets of polymer plastic, may be placed on the carrier 14.

It is also contemplated that the SCP panels produced by the present line 10 are formed directly upon the carrier 14. In the latter situation, at least one belt washing unit 28 is provided. The carrier 14 is moved along the support frame 12 by a combination of motors, pulleys, belts or chains which drive the main drive roll 16 as is known in the art. It is contemplated that the speed of the carrier 14 may vary to suit the product being made.

Chopper

In the present invention, structural cement panel (SCP panel) production is initiated by depositing a layer of loose, chopped fibers 30 of about one inch in size upon a plastic carrier on the web 26. A variety of fiber depositing and chopping devices are contemplated by the present line 10. For example, a typical system employs a rack 31 holding several spools 32 of fiberglass cord, from each of which a length or string 34 of fiber is fed to a chopping station or apparatus, also referred to as a chopper 36. Typically a number of strands of fiberglass are fed at each of the chopper stations.

The chopper 36 includes a rotating bladed roll 38 from which project radially extending blades 40 extending transversely across the width of the carrier 14, and which is disposed in close, contacting, rotating relationship with an anvil roll 42. In the preferred embodiment, the bladed roll 38 and the anvil roll 42 are disposed in relatively close relationship such that the rotation of the bladed roll 38 also rotates the anvil roll 42, however the reverse is also contemplated. Also, the anvil roll 42 is preferably covered with a resilient support material against which the blades 40 chop the cords 34 into segments. The spacing of the blades 40 on the roll 38 determines the length of the chopped fibers. As is seen in FIG. 1, the chopper 36 is disposed above the carrier 14 near the proximal end 22 to maximize the productive use of the length of the production line 10. As the fiber strands 34 are chopped, the fibers fall loosely upon the carrier web 26.

Slurry Mixer

Figure 1A:
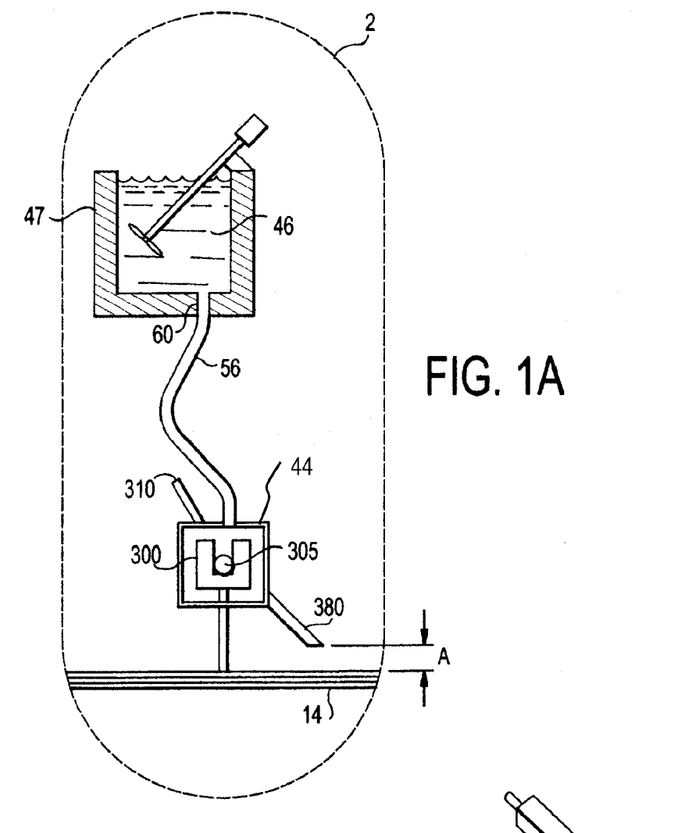
FIG. 1A is a view of a typical slurry mixer system pumping cementitious slurry into the headbox of the invention.

The present production line 10 includes a slurry preparation and feeding section 2 (FIG. 1A). Slurry preparation and feeding section 2 includes a slurry feed station or slurry feeder or slurry headbox, generally designated 44 and a source of slurry, which in this embodiment is a wet mixer 47. The slurry feeder 44 receives a supply of slurry 46 from the wet mixer 47 for depositing the slurry 46 on chopped fibers on the carrier web 26. It is also contemplated that the process may begin with the initial deposition of slurry upon the carrier 14.

While a variety of settable slurries are contemplated, the present process is particularly designed for producing structural cement panels (SCP panels). As such, the slurry 46 is preferably comprised of varying amounts of Portland cement, gypsum, aggregate, water, accelerators, plasticizers, foaming agents, fillers and/or other ingredients well known in the art, and described in the patents listed below which have been incorporated by reference. The relative amounts of these ingredients, including the elimination of some of the above or the addition of others, may vary to suit the intended use of the final product.

U.S. Pat. No. 6,620,487 to Tonyan et al., incorporated herein by reference in its entirety, discloses a reinforced, lightweight, dimensionally stable structural cement panel (SCP) which employs a core of a continuous phase resulting from the curing of an aqueous mixture of calcium sulfate alpha hemihydrate, hydraulic cement, an active pozzolan and lime. The continuous phase is reinforced with alkali-resistant glass fibers and containing ceramic microspheres, or a blend of ceramic and polymer microspheres, or being formed from an aqueous mixture having a weight ratio of water-to-reactive powder of 0.6/1 to 0.7/1 or a combination thereof. At least one outer surface of the SCP panels may include a cured continuous phase reinforced with glass fibers and containing sufficient polymer spheres to improve nailability or made with a water-to-reactive powders ratio to provide an effect similar to polymer spheres, or a combination thereof.

If desired the composition may have a weight ratio of water-to-reactive powder of 0.4/1 to 0.7/1.

Various formulations for the composite slurry used in the current process are also shown in published US patent applications US2006/185267, US2006/0174572; US2006/0168905 and US 2006/0144005, all of which are incorporated herein by reference in their entirety. A typical formulation would comprise as the reactive powder, on a dry basis, 35 to 75 wt. % calcium sulfate alpha hemihydrate, 20 to 55 wt. % hydraulic cement such as Portland cement, 0.2 to 3.5 wt. % lime, and 5 to 25 wt. % of an active pozzolan. The continuous phase of the panel would be uniformly reinforced with alkali-resistant glass fibers and would contain 20-50% by weight of uniformly distributed lightweight filler particles selected from the group consisting of ceramic microspheres, glass microspheres, fly ash cenospheres and perlite. Although the above compositions for the SCP panels are preferred, the relative amounts of these ingredients, including the elimination of some of the above or the addition of others, may vary to suit the intended use of the final product.

Figure 3:
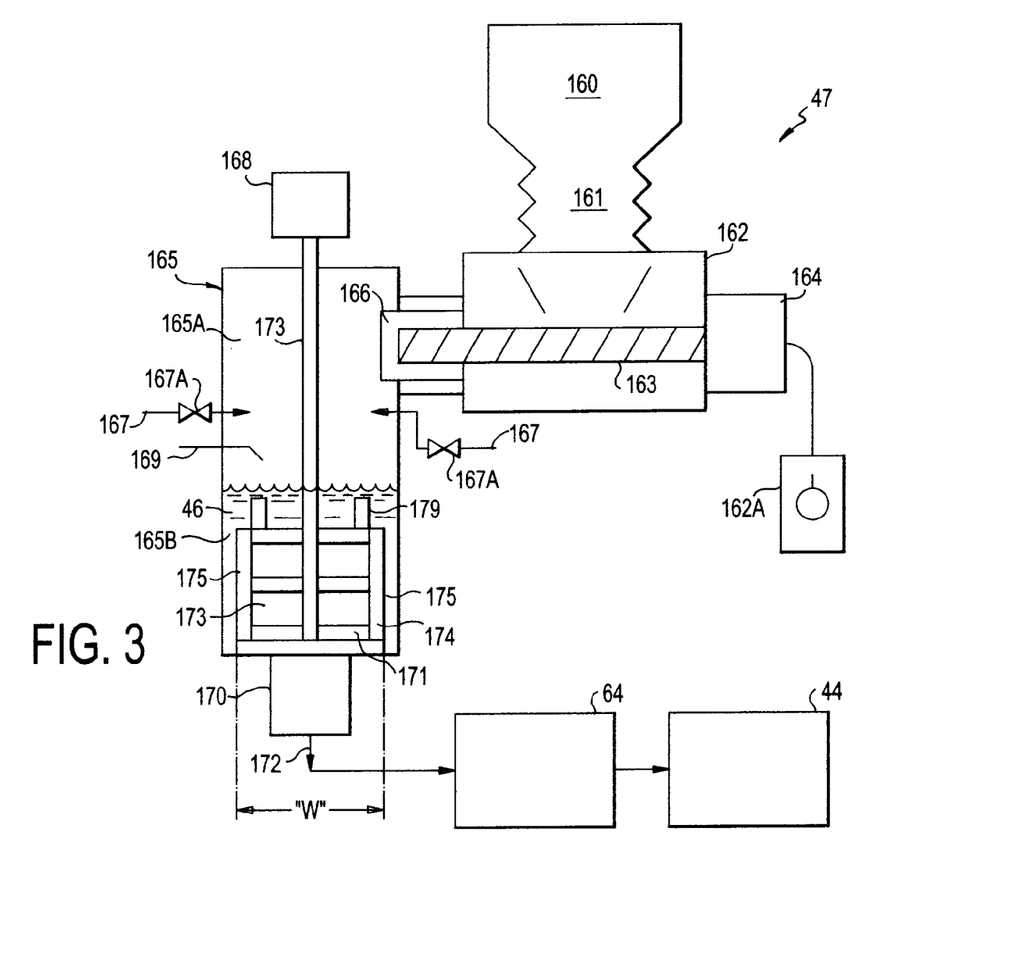
FIG. 3 is a side view of a typical slurry mixer which can be used with the headbox of the present slurry feed headbox.
Figure 4:
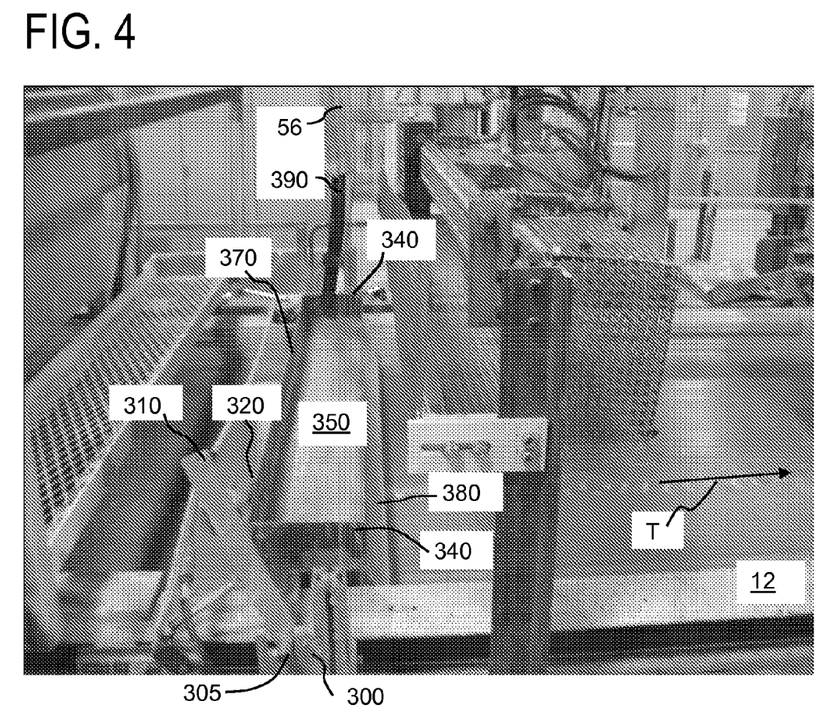
FIG. 4 is a photograph of a side view of the slurry head box of the invention installed on the guide rails of the production line.
Figure 5:
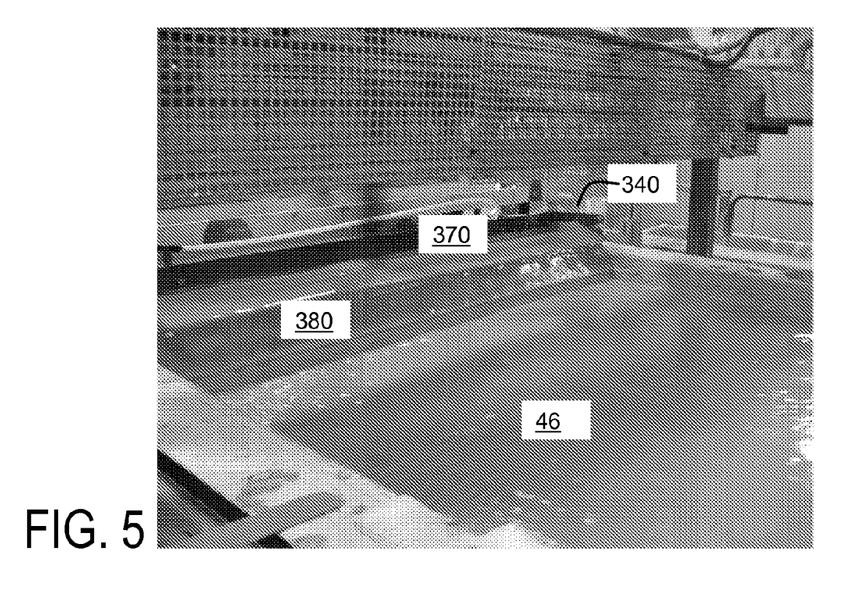
FIG. 5 is a photograph of the front prospective view of the slurry head box of the invention in operation on the production line.

An embodiment of the wet powder mixer 47 is shown in FIG. 3. A powder mixture of Portland cement, gypsum, aggregate, fillers, etc. is fed from an overhead hopper bin 160 through a bellows 161 to a horizontal chamber 162 which has an auger screw 163 driven by a side mounted auger motor 164. The solids may be fed from the hopper bin 160 to the auger screw 163 by a volumetric feeder or a gravimetric feeder (not shown).

Volumetric feeding systems would use the auger screw conveyor 163 running at a constant speed to discharge powder from the storage hopper bin 160 at a constant rate (volume per unit time, e.g., cubic feet per minute. Gravimetric feeding systems generally use a volumetric feeder associated with a weighing system to control the discharge of powder from the storage hopper bin 160 at a constant weight per unit of time, e.g., pounds per minute. The weight signal is used via a feedback control system to constantly monitor the actual feed rate and compensate for variations in bulk density, porosity, etc. by adjusting the speed (RPM) of the auger screw 163.

The auger screw 163 feeds the powder directly into the vertical mixing chamber 165 through powder inlet 166 located in an upper section 165A of the vertical mixing chamber 165. Then the powder drops by gravity into the agitator equipped lower section 165B of the vertical mixing chamber 165.

Liquid comprising water is simultaneously supplied to the vertical chamber 165 by water inlets 167, e.g. nozzles, disposed around the perimeter of the upper portion 165A of the chamber 165 at a point below the dry powder inlet 166 so that it also drops to the level of the agitator section (lower portion 165B) of the vertical chamber 165. The direction of the individual water inlets 167 can be manually adjusted to be directed on the paddle blades, etc. to maintain the surfaces free from powder build-up. The individual water inlets 167 may be provided with valves 167A. Dropping the powder and liquid separately into the vertical chamber 165 advantageously avoids clogging at the inlet of the powder to the chamber 165, that might occur if the liquid and powder were mixed before entering the chamber 165, and permits feeding the powder directly into the vertical chamber using a smaller outlet for the auger 163 than would be used if the liquid and powder were mixed before entering the chamber 165.

The water and powder are thoroughly mixed by the mixer paddle 174 which has multiple paddle blades 175 that are rotated on the paddle central shaft 173 by the top mounted electric motor 168. The number of paddle blades 175 on the central shaft and the configuration of the paddle blades 175 including the number of horizontal bars 171 used in each paddle blade 175 can be varied. For example, vertically mounted pins 179 (FIG. 3) may be added to the horizontal bars 171 of the blades 175 to enhance agitation of the slurry 46. Typically the bars 171 are flat horizontal members rather than angled, to reduce the vortex in the lower portion 165B of the mixing chamber 165. In the current embodiment, it has been found that a dual bladed paddle 174 with a lower number of horizontal bars 171 can be used in view of the higher mixing speeds obtained in a typical 12 inch diameter vertical chamber 165 of the present invention. The paddles for embodiments of the present invention for mixing SCP slurry are designed to accommodate the slurry and the diameter of the lower portion of the mixing chamber 165. Increasing the diameter of the lower portion of the mixing chamber results in increasing the transverse width "W" (FIG. 3) of the paddle 174. The increased transverse width "W" (FIG. 3) of the paddle 174 increases its tip speed at a given RPM. This causes a problem because the paddle is more likely to fling the slurry to the outer edges of the vertical mixing chamber 165 and create an undesirable deep vortex in the middle of the lower portion of the mixing chamber 165. The paddle for being employed with SCP slurry is preferably designed to minimize this problem by minimizing the number of horizontal mixing bars and flattening the horizontal mixing bars to minimize turbulence while still ensuring adequate mixing.

The level of the slurry 46 in the vertical mixing chamber 165 is controlled by electrical level control sensor 169 disposed within the vertical mixing chamber 165. The control sensor 169 controls the flow of water through electronically controlled valves 167A and controls the powder feed into the vertical chamber 165 by turning the auger motor 164 on or off via a controller 162A. The control of the volume of added water and slurry is thus used to control both the volume of the slurry in the vertical mixing chamber 165 and the mixing residence time in the vertical mixing chamber 165. Once the slurry 46 is adequately mixed, it is pumped from the bottom of the vertical mixing chamber 165 by the slurry pump 170 to the slurry feeding apparatus 44 by means of pump outlet 172. The pump 170 is run by the paddle central shaft 173 that is driven by the top mounted electric motor 168. However, a separate pump motor (not shown) could be used to drive the pump 170 if desired.

The mixing residence time of the powder and water in the vertical mixing chamber 165 is important to the design of the vertical chamber 165. The slurry mixture 46 must be thoroughly mixed and be of a consistency that can be easily pumped and deposited uniformly over the much thicker fiberglass layer on the web.

To result in adequately mixed slurry 46, the vertical chamber 165 provides a suitable mixing volume for an average slurry residence time of typically about 10 to about 360 seconds while the spinning paddle 174 applies shear force to the slurry in the mixing chamber. Typically, the vertical chamber 165 provides an average slurry residence time of about 15 to about 240 seconds. The RPM range of the mixer paddle 174 is typically 70 RPM to 270 RPM. Other typical ranges for average slurry residence time are from about 15 seconds to about 30 seconds or about 20 seconds to about 60 seconds.

A typical embodiment of a vertical chamber 165 of the mixer 47 has a nominal inside diameter of about 8 to 14 inches (20.3 to 35.6 cm) or 10 to 14 inches (25.4 to 35.6 cm), e.g., 12 inches (30.5 cm.), a total vertical height of about 20 to 30 inches (50.8 to 76.2 cm), e.g., about 25 inches (63.5 cm) and a vertical height below sensor 169 of about 6 to 10 inches (15.2 to 25.4 cm), e.g. about 8 inches (20.3 cm.). As the diameter increases, the paddles should be designed to accommodate these larger diameters to minimize the vortex effect caused by increases paddle tip speed at a given RPM as discussed above. The outer tips of the paddles are generally designed to be close, e.g., within about a quarter inch (0.64 cm) or about an eighth inch (0.32 cm), of the inner walls of the chamber 165. Too great a distance between the paddle tips and the inner walls of the chamber 165 would result in slurry build-up.

FIG. 3 shows the mixer 47 feeds dry cementitious powder directly into the chamber 165 and feeds liquid directly into the chamber 165 separately from the dry cementitious powder. Thus, mixer 47 causes the powder and liquid to drop independently generally downwardly through a space in the vertical mixing chamber between their respective inlets in the upper portion 165A of the mixing chamber 165 and the pool of slurry in the lower portion 165B of the mixing chamber 165. Typically both the solids and liquids drop at least 6 inches. Preferably the solids are fed to the chamber 165 at a point higher than the inlets for the liquid to the chamber 165.

The vertically mounted paddle 174 has an extended central shaft 173 as shown in FIG. 3. The design of the paddle 174, the number of paddle blades 175, and the number of horizontal bars 171 used with or without vertical mounted pins 179, is determined taking into account the speed of rotation of the mixer paddle 174, slurry viscosity, etc. to achieve the amount of mixing of the powder and water to prepare the wet slurry within the residence time of the slurry in the chamber to ensure continuous operation of the panel production line 10.

Suitable slurry mixers 47 are explained in greater detail in United States Patent Application Publication No. 2008/0101150 A1, entitled METHOD FOR WET MIXING CEMENTITIOUS SLURRY FOR FIBER-REINFORCED STRUCTURAL CEMENT PANELS, filed concurrently with the present application; and United States Patent Application Publication No. 2008/0101151 A1, entitled APPARATUS AND METHOD FOR WET MIXING CEMENTITIOUS SLURRY FOR FIBER-REINFORCED STRUCTURAL CEMENT PANELS, both filed on Nov. 1, 2006; both incorporated herein by reference in their entirety.

Slurry Feed Apparatus

Referring now to FIGS. 1-1A, and 4-7, as mentioned above, the present slurry feed apparatus, also referred to as a slurry headbox, slurry feed station, or slurry feeder, generally designated 44 receives a supply of slurry 46 from the wet mixer 47.

While a variety of settable slurries are contemplated, the present process is particularly designed for producing structural cement panels. As such, the slurry 46 is preferably comprised of varying amounts of Portland cement, gypsum, aggregate, water, accelerators, plasticizers, foaming agents, fillers and/or other ingredients well known in the art, and described in the patents listed above which have been incorporated by reference. The relative amounts of these ingredients, including the elimination of some of the above or the addition of others, may vary to suit the final product intended to be produced. A typical material for producing structural cement panels is disclosed by U.S. Patent Application Publication No. 2006/0174572 to Tonyan et al., incorporated herein by reference.

The slurry feeder 44 also has pivot pins 305 with gussets 308 on the outer surface next to the outer surface of sidewalls 340. A slurry is pumped from the mixer from feed line 56 (FIG. 1A) to the slurry feed line 390 mounted on a transversely moving trolley (not shown) above the inner bottom surface 350 of the headbox to allow the slurry to be pumped along the entire inner surface of the headbox. The speed of the moving trolley is adjusted to maintain even distribution of the slurry along the entire surface of the headbox while the slurry is building up in the bottom of the headbox to a level in which it spills over the lip of the spillway 380 and is deposited in a continuous curtain on the top surface of the slurry on the web 26. A hand lever 310 is mounted on at least one of the pivot pins 305 to allow the operator to rotate or tilt the headbox within the adjustable vertical yokes 300 mounted on the guide rails 12 which are parallel to the direction of travel of the moving forming web 26 on the production line.

Figure 7:
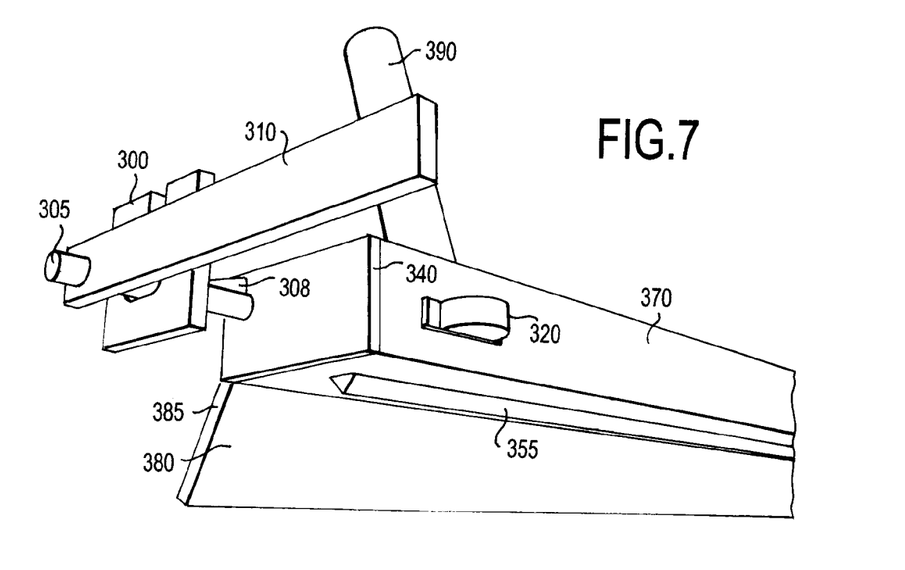
FIG. 7 is another perspective view of the back of the headbox of the present invention showing the vibrator mounted on the back wall of the headbox of the invention.

The headbox 44 is vibrated by the rotary vibrator 320 mounted on the outer surface of the headbox 44 and typically operated by a conventional hydraulic line (not shown). The rotary vibrator 320 is typically mounted on the outside of the headbox back wall 370, as shown in FIG. 7 A stiffening member 355 is typically an angle iron mounted on the bottom surface of the headbox bottom wall 350. The stiffening member 355 is used to prevent damage to the bottom of the headbox, including "bowing" of the center of the headbox from the pressure of the slurry being pumped into the headbox, which would interfere with the ability to lay down a continuous layer of slurry on to the web 26.

The vibrating means 320 on the back surface of wall 370 of the headbox can be a pneumatic rotary ball vibrator. The level of vibration can be controlled with a conventional air regulator (not shown).

Typically the slurry feeder (headbox 44) is formed from a piece of metal bent to form a rigid vertical back wall 370, a horizontal bottom wall 350 and an inclined spillway 380 leading from the bottom wall 350 to just above the top surface of the moving forming web 26. The headbox is then formed with a pair of relatively rigid vertical sidewalls 340. The inclined spillway 380 has sidewalls 385. All of the inner surfaces of the headbox 44 are preferably made of, or coated with non-stick material such as TEFLON® material or the like. The sidewalls 340 and back wall 370 prevent slurry 46 from escaping out the sides of the slurry feeder (headbox 44). The sidewalls 340, which have pivot pins 305 on each end of the outer surface of the side walls are mounted on the support frame 12 (FIG. 5) by vertically adjusted open yokes 300 which allow for easy removal of the headbox 44 from the guide line 12 on the frame of the production line. The pivot pins allow the headbox 44 to be tilted up or down manually, typically by use of lever 310, although a less preferred automatic adjustment could be used. For example, in the event of a line shutdown, the headbox 44 could be made to tilt back to prevent slurry from continuously running down the spillway 380, or all of the slurry could be immediately dumped from the headbox down the spillway 380 on to the moving web 26. This prevents waste of slurry and helps prevent the production of unacceptable panels.

The pivot pins 305 on the headbox are specifically positioned by the operator by adjusting the incline of the pins in the yokes 300 by use, for example, of lever 310 on the pivot pins, to maintain an angle of tip of about 45 degrees and a tip edge of spillway 380 to product of distance "A" (shown in FIG. 1A) to maintain an unbroken curtain of slurry 46.

The tip edge is designed to keep the edge low enough to maintain an unbroken curtain across the width of the web while keeping he tip edge high enough to allow debris and chunks underneath the spillway without catching the tip. The distance has been found to be typically between 0.5 and 1.5 inches (1.27-3.81 cm). This distance allows for maintenance of a good curtain while allowing any debris or chunks of cement from getting caught on the back side of the spillway and causing "drags" which can cause formation of waste boards. The pivot pins are located as close to the tip edge as practical to allow the operator to change the angle of the headbox while maintaining the tip-edge-to-product distance.

An important feature of the present invention is that the slurry feeder 44 deposits an even layer of the slurry 46 of relatively controlled thickness upon the moving carrier web 26. Suitable layer thicknesses range from about 0.08 inch to 0.16 inch or 0.25 inch. However, with four layers preferred in the structural panel produced by the production line 10, and a suitable building panel being approximately 0.5 inch, an especially preferred slurry layer thickness is in the range of 0.125 inch. However, for a target panel forming thickness is about 0.84", the standard layer thickness is typically closer to about 0.21 inches at each of the 4 forming stations. A range of 0.1 inch to 0.3 inch per headbox may also be suitable.

To ensure a uniform disposition of the slurry 46 across the entire web 26, the slurry 46 is delivered to the slurry feeder 44 through a hose 56 or similar conduit in fluid communication with the outlet of the slurry mixer or reservoir 47 to a slurry feed line 390 mounted on a reciprocally travelling trolley (not shown) above the inner surface 350 of the headbox 44. A second end of the hose 56 is connected to a laterally reciprocating, cable driven, fluid-powered dispenser 390 (FIG. 6) of the type well known in the art. Slurry flowing from the hose 56 to slurry feed line 390 into the feeder 44 in a laterally reciprocating motion to fill the inside of headbox defined by the sidewalls 340, bottom wall 350, back wall 370 and the lip of the spillway 380 of the slurry headbox 44.

The depth of slurry in the headbox typically reaches about ¼ inch, (86 mm) measured from the bottom of the headbox bottom wall 350 to the top of the lip of the spillway 380, before spilling over the lip and onto the spillway surface.

As the slurry 46 on the inclined spillway 380 moves toward the moving carrier web 26, it is important that all of the slurry move evenly down the spillway 380 and be deposited on the web.

To assist in this, the slurry feeder 44 has a spillway 380 directed downwardly onto the web to ensure that the relatively thin slurry 46 is completely deposited as a continuous curtain or sheet of slurry is uniformly directed down to within a distance of about 0.5 to about 1.5 inches (172 to 381 mm.) of the carrier web 26. The spillway has edges 385 on each side of the spillway to ensure that slurry is not lost over the sides and not directed onto the travelling web.

Figure 1B:
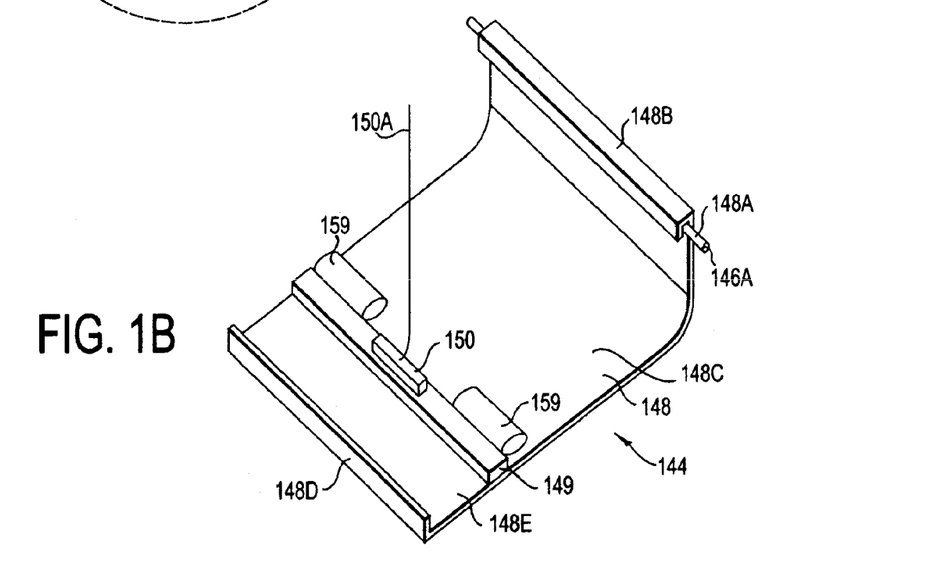
FIG. 1B is a view of a screed plate forming device suitable for use in forming the slurry on the web after the slurry is deposited on the production line from the slurry headbox of the present invention.

In one embodiment of the invention, a vibrating forming or screed plate 144, as shown in FIGS. 1 and 1B and described in more detail in the description of the forming and smoothing process below, can be added to the production line immediately after the slurry is deposited from the headbox 44 onto the web 26.

Processing Downstream of the Slurry Feed Apparatus

Referring again to FIG. 1, the other operational components of the SCP panel production line will be described briefly, but they are described in more detail in the following documents:

U.S. Pat. No. 6,986,812, to Dubey et al. entitled SLURRY FEED APPARATUS FOR FIBER-REINFORCED STRUCTURAL CEMENTITIOUS PANEL PRODUCTION, herein incorporated by reference in its entirety; and the following co-pending, commonly assigned, United States patent applications all herein incorporated by reference in their entirety:

United States Patent Application Publication No. 2005/0064164 A1 to Dubey et al., application Ser. No. 10/666,294, entitled, MULTI-LAYER PROCESS AND APPARATUS FOR PRODUCING HIGH STRENGTH FIBER-REINFORCED STRUCTURAL CEMENTITIOUS PANELS;

United States Patent Application Publication No. 2005/0064055 A1 to Porter, application Ser. No. 10/665,541, entitled EMBEDMENT DEVICE FOR FIBER-ENHANCED SLURRY;

United States Patent Application Publication No. 2008/0101150 A1, entitled METHOD FOR WET MIXING CEMENTITIOUS SLURRY FOR FIBER-REINFORCED STRUCTURAL CEMENT PANELS, filed Nov. 1, 2006;

United States Patent Application Publication No. 2008/0101151 A1, entitled APPARATUS AND METHOD FOR WET MIXING CEMENTITIOUS SLURRY FOR FIBER-REINFORCED STRUCTURAL CEMENT PANELS, filed Nov. 1, 2006;

United States Patent Application Publication No. 2008/0099133 A1, entitled PANEL SMOOTHING PROCESS AND APPARATUS FOR FORMING A SMOOTH CONTINUOUS SURFACE ON FIBER-REINFORCED STRUCTURAL CEMENT PANELS, filed Nov. 1, 2006;

United States Patent Application Publication No. 2008/0101151 A1, entitled WET SLURRY THICKNESS GAUGE AND METHOD FOR USE OF SAME, filed Nov. 1, 2006;

United States Patent Application Publication No. 2007/0110970 A1, entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT, filed Nov. 1, 2006;

United States Patent Application Publication No. 2007/0110838 A1, entitled EMBEDMENT ROLL DEVICE, filed Nov. 1, 2006;

all herein incorporated by reference in their entirety.

Embedment Device

While a variety of embedment devices are contemplated, including, but not limited to vibrators, sheep's foot rollers and the like, in the present embodiment of the embedment device 70 includes at least a pair of generally parallel shafts 76 mounted transversely to the direction of travel of the carrier web 14 on the frame 12. Each shaft 76 is provided with a plurality of relatively large diameter disks 76 which are axially separated from each other on the shaft by small diameter disks (not shown).

During SCP panel production, the shafts 76 and the disks 74 rotate together about the longitudinal axis of the shaft 76. As is well known in the art, either one or both of the shafts 76 may be powered, and if only one is powered, the other may be driven by belts, chains, gear drives or other known power transmission technologies to maintain a corresponding direction and speed to the driven shaft. The respective disks 74 of the adjacent, preferably parallel shafts 76 overlap and are intermeshed with each other for creating a "kneading" or "massaging" action in the slurry, which embeds the previously deposited fibers 68. In addition, the close, intermeshed and rotating relationship of the disks 74 prevents the buildup of slurry 46 on the disks, and in effect creates a "self-cleaning" action which significantly reduces production line downtime due to premature setting of clumps of slurry.

The intermeshed relationship of the disks 74 on the shafts 76 includes a closely adjacent disposition of opposing peripheries of the small diameter spacer disks (not shown) and the relatively large diameter main disks 74, which also facilitates the self-cleaning action. As the disks 74 rotate relative to each other in close proximity (but preferably in the same direction), it is difficult for particles of slurry to become caught in the apparatus and prematurely set. By providing two sets of disks 74 which are laterally offset relative to each other, the slurry 46 is subjected to multiple acts of disruption, creating a "kneading" action which further embeds the fibers 68 in the slurry 46.

An embodiment of embedment device 70 suitable for use in production line 10 is disclosed in greater detail in co-pending U.S. patent application Ser. No. 10/665,541, filed Sep. 18, 2003, published as US 2005/0064055, and entitled EMBEDMENT DEVICE FOR FIBER-ENHANCED SLURRY, and incorporated herein by reference in its entirety.

Another embodiment of an embedment device suitable for use in production line 10 is disclosed by U.S. patent application Ser. No. 11/591,793, entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT, filed Nov. 1, 2006, and United States Patent Application Publication 2007/0110838 A1, entitled EMBEDMENT ROLL DEVICE, filed Nov. 1, 2006, both incorporated herein by reference in its entirety.

Applying Additional Layers

Once the fiber 68 has been embedded, a first layer 77 of the panel 92 is complete. In a preferred embodiment, the height or thickness of the first layer 77 is in the approximate range of 0.05 to 0.15 inches. This range has been found to provide the desired strength and rigidity when combined with like layers in a SCP panel. However other thicknesses are contemplated depending on the final intended use of the SCP panel.

To build a structural cementitious panel of desired thickness, additional layers are typically added. To that end, a second slurry feeder 78, which is substantially identical to the feeder 44, is provided in operational relationship to the moving carrier 14, and is disposed for deposition of an additional layer 80 of the slurry 46 upon the existing layer 77.

Next, an additional chopper 82, substantially identical to the choppers 36 and 66, is provided in operational relationship to the frame 12 to deposit a third layer of fibers 68 provided from a rack (not shown) constructed and disposed relative to the frame 12 in similar fashion to the rack 31. The fibers 68 are deposited upon the slurry layer 80 and are embedded using a second embedment device 86. Similar in construction and arrangement to the embedment device 70, the second embedment device 86 is mounted slightly higher relative to the moving carrier web 14 so that the first layer 77 is not disturbed. In this manner, the second layer 80 of slurry and embedded fibers is created.

Figure 2:
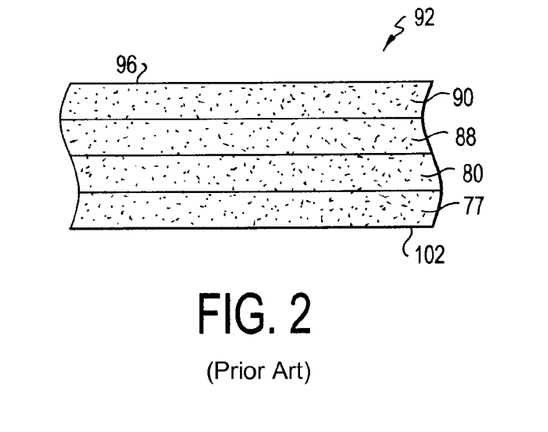
FIG. 2 is a fragmentary vertical section of a structural cementitious panel produced according to the present procedure.

Referring now to FIGS. 1 and 2, with each successive layer of settable slurry and fibers, an additional slurry feeder station 78 followed by a fiber chopper 82 and an embedment device 86 is provided on the production line 10. In the preferred embodiment, four total layers 77, 80, 88, 90 are provided to form the SCP panel 92.

An important feature of the present invention is that the panel 92 has multiple layers 77, 80, 88, 90 which upon setting, form an integral, fiber-reinforced mass. Provided that the presence and placement of fibers in each layer are controlled by and maintained within certain desired parameters as is disclosed and described herein, it will be virtually impossible to delaminate the panel 92 produced by the present process.

Forming and Smoothing and Cutting

Upon the disposition of the four layers of fiber-embedded settable slurry as described above, a forming device may provided to the frame 12 to shape an upper surface 96 of the panel 92.

However, forming devices which scrape away excess thickness of SCP panel material are not desired. For example, forming devices such as spring-loaded or vibrating plates or vibrating leveling screed plates designed to conform the panel to suit desired dimensional characteristics are not used with SCP material since they scrape away excess thickness of SCP panel material are not employed. Such devices would not effectively scrape away or flatten the panel surface. They would cause the fiberglass to begin to roll up and mar the surface of the panel instead of flattening and smoothing it.

In particular, rather than spring-loaded devices and vibrating leveling screed plates, the production line 10 may include a smoothing device, also termed a vibrating shroud, 144 provided to the frame 12 to gently smooth an upper surface 96 of the panel 92. The smoothing device 144 includes a mounting stand 146 (FIG. 1B), a flexible sheet 148 secured to the mounting stand, a stiffening member 150B extending the width of the sheet 148 and a vibration generator (vibrator) 150 preferably located on the stiffening member to cause the sheet 148 to vibrate. The sheet 148 has a first upstanding wall 148A provided with a U-shaped upper portion 148B, a curved wall 148C and a second upstanding wall 148D. The vibrator 150 is powered by a pneumatic hose 150A. The curved panel 148C of the smoothing device 144 has an upstream end pivotally attached to a support bar 146A which in turn is attached to mount 146 on the production line 10. The curved panel 148C has a trailing downstream end which contacts the topmost layer of the SCP material passing underneath it. If desired the smoothing device 144 is provided with weights 159 to assist in leveling the topmost layer of slurry. The smoothing device 144 may be provided after the last embedment station 86 or smoothing devices may be provided after each embedment station 70, 86.

The stiffening member 150B functions not only to stiffen the smoothing sheet, but, by mounting the vibratory unit on this stiffening member, this distributes the vibration across the length of the device more evenly. For example, if we mount the vibratory unit directly to the smoothing sheet (say, in the center), without the stiffening member, the vibration from the vibratory unit would be highly localized at the mounting point, with relatively little vibration out on the edges of the sheet. This is not to say that the vibratory unit cannot be mounted anywhere besides the stiffening member 150B, but it is a preferred location since a stiffening member is typically anyway and it does a good job of equally distributing the vibration.

By applying vibration to the slurry 46, the smoothing device 144 facilitates the distribution of the fibers 30, 68 throughout the panel 92, and provides a more uniform upper surface 96.

Additional details regarding the forming device, also known as the vibrating shroud, 144 are disclosed by United States Patent Application Publication No. 2008/0099133 A1, entitled PANEL SMOOTHING PROCESS AND APPARATUS FOR FORMING A SMOOTH CONTINUOUS SURFACE ON FIBER-REINFORCED STRUCTURAL CEMENT PANELS, filed Nov. 1, 2006 and incorporated herein by reference in its entirety.

Other forming devices are contemplated as otherwise known in the art. However, the smoothing device 144 advantageously avoids disrupting or tearing portions of the SCP panel from carrier web 26. Forming devices that scrape away excess SCP material are not employed because they disrupt or tear the SCP material due to the fibrous nature of the panel product as it is being formed.

At this point, the layers of slurry have begun to set, and the respective panels 92 are separated from each other by a cutting device 98, which in a typical embodiment is a water jet cutter. Other cutting devices, including moving blades, are considered suitable for this operation, provided they can create suitably sharp edges in the present panel composition. The cutting device 98 is disposed relative to the line 10 and the frame 12 so that panels are produced having a desired length, which may be different from the representation shown in FIG. 1. Since the speed of the carrier web 14 is relatively slow, the cutting device 98 may be mounted to cut perpendicularly to the direction of travel of the web 14. With faster production speeds, such cutting devices are known to be mounted to the production line 10 on an angle to the direction of web travel. Upon cutting, the separated panels 92 are stacked for further handling, packaging, storage and/or shipment as is well known in the art.

The production line 10 includes sufficient fiber chopping stations 36, 66, 82, slurry feeder stations 44, 78 and embedment devices 70, 86 to produce at least four layers 77, 80, 88 and 90 (FIG. 2). Additional layers may be created by repetition of stations as described above in relation to the production line 10.

Upon creation of the SCP panels 92, an underside 102 or bottom face of the panel may be smoother than the upper side or top face 96, even after being engaged by the forming device 94. In some cases, depending on the application of the panel 92, it may be preferable to have a smooth face and a relatively rough face. However, in other applications, it may be desirable to have a board in which both faces 96, 102 are smooth. The smooth texture is generated by the contact of the slurry with the smooth carrier 14 or the carrier web 26.

To obtain a SCP panel with both faces or sides smooth, both upper and lower faces 96, 102 may be formed against the carrier 14 or the release web 26 as disclosed by United States Patent Application Publication No. 2007/0110970 A1, entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT, filed Nov. 1, 2006.

Another alternative (not shown) is to sand one or both faces or sides 96, 102.

Another feature of the present invention is that the resulting SCP panel 92 is constructed so that the fibers 30, 68 are uniformly distributed throughout the panel. This has been found to enable the production of relatively stronger panels with relatively less, more efficient use of fibers. The volume fraction of fibers relative to the volume of slurry in each layer preferably constitutes approximately in the range of 1% to 5% by volume, preferably 1.5% to 3% by volume, of the slurry layers 77, 80, 88, 90. If desired, the outer layers 77, 90 may have a higher volume fraction that either or both of inner layers 80, 88.

Second Embodiment of a Production Line

The incorporation of a volume fraction of loose fibers distributed throughout the slurry 46 is an important factor in obtaining desired panel strength. Thus, improved efficiency in incorporating such fibers is desirable. It is believed the system depicted in FIG. 1 in some cases requires excessive numbers of slurry layers to obtain an SCP panel having sufficient fiber volume fraction.

Figure 8:
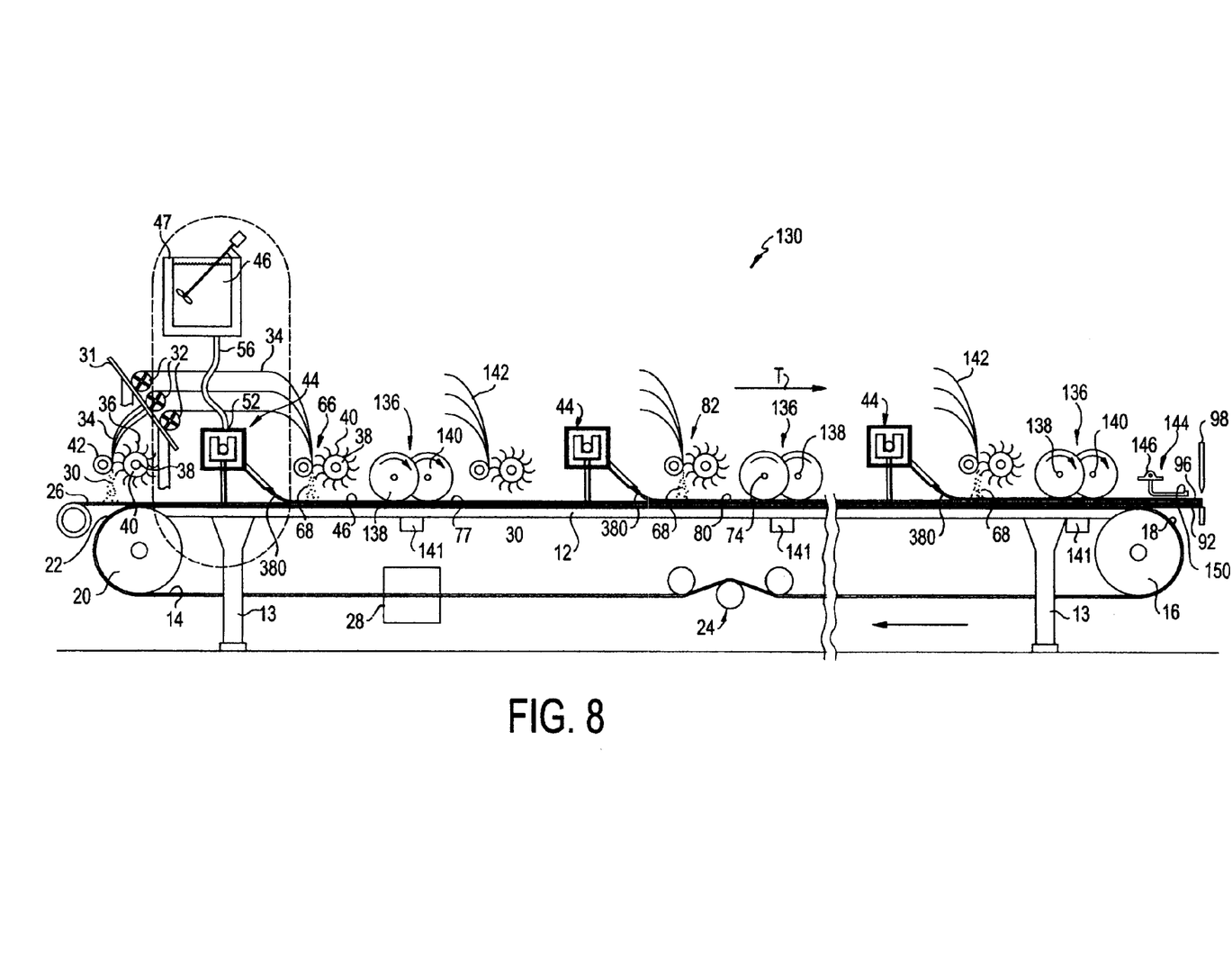
FIG. 8 is a diagrammatic elevation view of another embodiment of an SCP panel production line suitable for use with the present slurry headbox.

Accordingly, an alternate SCP panel production line or system is illustrated in FIG. 8 and is generally designated 130 for producing high-performance, fiber reinforced SCP panels incorporating a relatively high volume of fibers per slurry layer. In many cases, increased levels of fibers per panel are obtained using this system. While the system of FIG. 1 discloses depositing a single discrete layer of fibers into each subsequent discrete layer of slurry deposited after the initial layer, the production line 130 includes a process of building up multiple discrete reinforcing fiber layers in each discrete slurry layer to obtain the desired panel thickness. Most preferably, the disclosed system embeds at least two discrete layers of reinforcing fibers, in a single operation, into an individual discrete layer of slurry. The discrete reinforcing fibers are embedded into the discrete layer of slurry using a suitable fiber embedment device.

More specifically, in FIG. 8 components used in the system 130 and shared with the system 10 of FIG. 1 are designated with identical reference numbers, and the above description of those components is considered applicable here. Furthermore, it is contemplated that the apparatus described in relation to FIG. 8 may be combined with that of FIG. 1 in a retrofit manner or be a new construction.

It is also contemplated that the system 130 of FIG. 8 may be provided with the upper deck 106 of U.S. patent application Ser. No. 11/591,793, entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT, filed Nov. 1, 2006.

In the alternate system 130, SCP panel production is initiated by depositing a first layer of loose, chopped fibers 30 upon the web 26. Next, the slurry feed station, or the slurry feeder 44 receives a supply of slurry 46 from the remote mixer 47.

It is contemplated that the mixer 47 and slurry 46 and the slurry feeder 44 in this embodiment are the same as that used in the production line 10 of FIG. 1.

Also, the slurry feeder 44 is basically the same, including the sidewalls 340 and 370 and the spillway 380. Suitable layer thicknesses range from about 0.05 inch to 0.35 inch (0.13 to 0.9 cm). For instance, for manufacturing a nominal ¾ inch (1.9 cm) thick structural panel, four layers are preferred with an especially preferred slurry layer thickness less than approximately 0.25 inch (0.64 cm) in the preferred structural panel produced by the present process.

Figure 6:
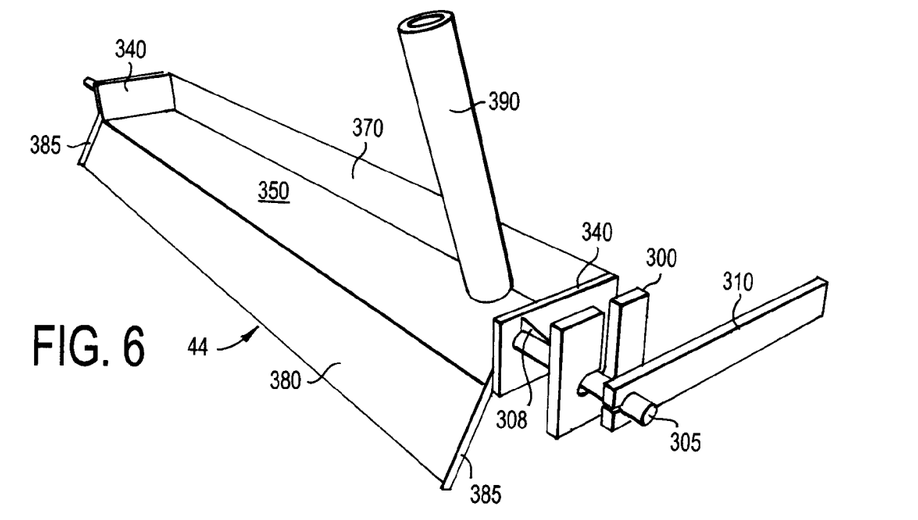
FIG. 6 is a perspective view of the headbox of the present invention with pivot pins mounted in a vertical yoke.

Referring to FIG. 1A, the slurry 46 is delivered to the feeder 44 through the hose 56 located in the laterally reciprocating, cable driven, fluid powered dispenser 390 (shown in FIGS. 6 and 7). Slurry flowing from the hose 56 is thus poured into the feeder 44 in a laterally reciprocating motion to fill the bottom surface 350 of the headbox defined by the sidewalls 340 and 370 and the spillway 380.

As the slurry 46 on the inner surface down to within about 1.5 inches of the carrier web 26, allowing an unbroken curtain of slurry to be continuously deposited onto the web or forming line, which is important to producing homogeneous panels A second chopper station or apparatus 66, preferably identical to the chopper 36, is disposed downstream of the feeder 44 to deposit a second layer of fibers 68 upon the slurry 46. The chopper apparatus 66 may be fed cords 34 from the same rack 31 that feeds the chopper 36. However, it is contemplated that separate racks 31 could be supplied to each individual chopper.

Referring again to FIG. 8, next, an embedment device, generally designated 136, is disposed in operational relationship to the slurry 46 and the moving carrier 14 of the production line 130 to embed the first and second layers of fibers 30, 68 into the slurry 46. While a variety of embedment devices are contemplated, including, but not limited to vibrators, sheep's foot rollers and the like, in the preferred embodiment, the embedment device 136 is similar to the embedment device 70 with the exception that the overlap of the adjacent shafts 138 have been decreased to the range of approximately 0.5 inch. Also, the number of disks 140 has been reduced, and the disks are substantially thicker. In addition, there is a tighter spacing or clearance between adjacent overlapping disks 140 of adjacent shafts 138, on the order of 0.010 to 0.018 inches, to prevent fibers from becoming lodged between adjacent disks.

Further details of the embedment device 136 are found in copending, commonly assigned US Patent Application Publication No 2007/0110838A1 entitled EMBEDMENT ROLL DEVICE, filed Nov. 1, 2006, which is incorporated by reference.

Otherwise, the embedment device 136 provides the same sort of kneading action as the device 70, with the objective of embedding or thoroughly mixing the fibers 30, 68 within the slurry 46.

If desired to further enhance the embedment of the fibers 30, 68 into the slurry 46, at each embedment device 136 the frame 12 is provided with at least one vibrator 141 in operational proximity to the carrier web 14 or the paper web 26 to vibrate the slurry 46. Such vibration has been found to more uniformly distribute the chopped fibers 30, 68 throughout the slurry 46. Conventional vibrator devices are deemed suitable for this use.

As seen in FIG. 8, to implement the present system 130 of multiple layers of fibers 30, 68 for each layer of slurry 46, additional chopping stations 142 are provided between the embedment device 136 and subsequent slurry feeder boxes 78, so that for each layer of slurry 46, fibers 30, 68 are deposited before and after deposition of the slurry. This improvement has been found to enable the introduction of significantly more fibers into the slurry and accordingly increase the strength of the resulting SCP panel. In the preferred embodiment, while only three are shown, four total layers of combined slurry and fiber are provided to form the SCP panel 92.

Upon the disposition of the four layers of fiber-embedded settable slurry as described above, a forming device such as the smoothing device, or vibrating shroud, 144 is preferably provided to the frame 12 to shape or smooth an upper surface 96 of the panel 92. By applying vibration to the slurry 46, the smoothing device 144 facilitates the distribution of the fibers 30, 68 throughout the panel 92, and provides a more uniform upper surface 96. The smoothing device 144 includes a mounting stand 146, a flexible sheet 148 secured to the mounting stand, a stiffening member 149 extending the width of the sheet 148 and a vibration generator 150 preferably located on the stiffening member to cause the sheet to vibrate.

As mentioned above, an important feature of the present invention is that the panel 92 has multiple layers 77, 80, 88, 90 which upon setting, form an integral, fiber-reinforced mass. Provided that the presence and placement of fibers in each layer are controlled by and maintained within certain desired parameters as is disclosed and described below, it will be virtually impossible to delaminate the panel 92 produced by the present process.

Utilizing two discrete layers of reinforcing fibers with each individual discrete slurry layer provides the following benefits. First, splitting the total amount of fibers to be incorporated in the slurry layer into two or more discrete fiber layers reduces the respective amount of fibers in each discrete fiber layer. Reduction in the amount of fibers in the individual discrete fiber layer enhances efficiency of embedment of fibers into the slurry layer. Improved fiber embedment efficiency in turn results in superior interfacial bond and mechanical interaction between the fibers and the cementitious matrix.

Next, a greater amount of reinforcing fibers can be incorporated into each slurry layer by utilizing multiple discrete layers of reinforcing fibers. This is due to the finding that the ease of embedment of the fibers into the slurry layer has been found to depend upon the total surface area of the fibers in the discrete fiber layer. Embedment of the fibers in the slurry layer becomes increasingly difficult as the amount of fibers in the discrete fiber layer increases, causing an increase in the surface area of the fibers to be embedded in the slurry layer. It has been found that when the total surface area of the fibers in the discrete fiber layer reaches a critical value, embedment of the fibers into the slurry layers becomes almost impossible. This imposes an upper limit on the amount of fibers that can successfully be incorporated in the discrete layer of slurry. For a given total amount of fibers to be incorporated in the discrete slurry layer, use of multiple discrete fiber layers reduces the total surface area of the fibers in each discrete fiber layer. This reduction in the fiber surface area (brought about by the use of multiple discrete fiber layers) in turn provides an opportunity to increase the total amount of fibers that can successfully be embedded into the discrete layer of slurry.

In addition, the use of multiple discrete fiber layers allows tremendous flexibility with respect to the distribution of fibers through the panel thickness. The amount of fibers in the individual discrete fiber layers may be varied to achieve desired objectives. The resulting creation of a "sandwich" construction is greatly facilitated with the presence of a larger number of discrete fiber layers. Panel configurations with fiber layers having higher amount of fibers near the panel skins and lower amount of fibers in the fiber layers near the panel core are particularly preferred from both product strength and cost optimization perspectives.

In quantitative terms, the influence of the number of fiber and slurry layers, the volume fraction of fibers in the panel, and the thickness of each slurry layer, and fiber strand diameter on fiber embedment efficiency has been investigated and established as part of the present system 130. A mathematical treatment for the concept of projected fiber surface area fraction for the case involving two discrete fiber layers and one discrete slurry layer is introduced and derived below. It has been found that it is virtually impossible to embed fibers in the slurry layer if the projected fiber surface area fraction of the discrete fiber layer exceeds a value of 1.0. Although the fibers may be embedded when the projected fiber surface area fraction falls below 1.0, the best results are obtained when the projected fiber surface area fraction is less than 0.65. When the projected fiber surface area fraction ranges between 0.65 and 1.00, the efficiency and ease of fiber embedment varies with best fiber embedment at 0.65 and worst at 1.00. Another way of considering this fraction is that approximately 65% of a surface of the slurry is covered by fibers.

Let, $v_t$=Total volume of a fundamental fiber-slurry layer $v_{f,l}$=Total fiber volume/layer $v_{f1}$=Volume of fiber in discrete fiber layer 1 of a fundamental fiber-slurry layer $v_{f2}$=Volume of fiber in discrete fiber layer 2 of a fundamental fiber-slurry layer $v_{s,l}$=Volume of slurry in a fundamental fiber-slurry layer $V_{f,l}$=Total volume fraction of fibers in a fundamental fiber-slurry layer $d_f$=Diameter of individual fiber strand $l_f$=Length of individual fiber strand $t_l$=Total thickness of individual layer including slurry and fibers $t_{s,l}$=Slurry layer thickness in a fundamental fiber-slurry layer $X_f$=Ratio of layer 2 fiber volume to layer 1 fiber volume of a fundamental fiber-slurry layer $n_{f,l}$, $n_{f1,l}$, $n_{f2,l}$=Total number of fibers in a fiber layer $s_{f,l}^P$, $s_{f1,l}^P$, $s_{f2,l}^P$=Total projected surface area of fibers contained in a fiber layer $S_{f,l}^P$, $S_{f1,l}^P$, $S_{f2,l}^P$=Projected fiber surface area fraction for a fiber layer To determine the projected fiber surface area fraction for a fiber layer in an arrangement of a fiber layer/slurry layer/fiber layer sandwich composed of one discrete slurry layer and two discrete fiber layers, the following relationship is derived.

Let,

The volume of the slurry layer be equal to $v_{s,l}$

The volume of the fibers in the layer 1 be equal to $v_{f1}$

The volume of the fibers in the layer 2 be equal to $v_{f2}$

The total volume fraction of fibers in the fundamental fiber-slurry layer be equal to $V_{f,l}$ The total thickness of the fundamental fiber-slurry layer be equal to $t_l$ The thickness of the slurry layer be equal to $t_{s,l}$ Let, The total volume of fibers (i.e., fibers in layer 1 and layer 2) be equal to $v_{f,l}$:

$$v_{f,l} = v_{f1} + v_{f2} \quad (1)$$

and, $$\frac{v_{f2}}{v_{f1}} = X_f \quad (2)$$

Let,

The total volume of the fundamental fiber-slurry layer, $v_t$=

Total volume of slurry layer+Total volume of the two fiber layers=

$$v_{s,l} + v_{f,l} = v_{s,l} + v_{f1} + v_{f2} \quad (3)$$

Combining (1) and (2):

$$v_{f1} = \frac{v_{f,l}}{(1+X_f)} \quad (4)$$

The total fiber volume of the fundamental fiber-slurry layer in terms of the total fiber volume fraction can be written as:

$$v_{f,l} = v_t * V_{f,l} \quad (5)$$

Thus, the volume of fibers in the layer 1 can be written as:

$$v_{f1} = \frac{v_t V_{f,l}}{(1+X_f)} \quad (6)$$

Similarly, the volume of fibers in the layer 2 can be written as:

$$v_{f2} = \frac{X_f v_t V_{f,l}}{(1+X_f)} \quad (7)$$

Assuming fibers to have cylindrical shape, the total number of fibers in the layer 1, $n_{f1,l}$ can be derived from Equation 6 as follows:

$$n_{f1,l} = \frac{4 v_t V_{f,l}}{\pi (1+X_f) d_f^2 l_f} \quad (8)$$

where, $d_f$ is the fiber strand diameter and $l_f$ is the fiber strand length

Similarly, the total number of fibers in the layer 2, $n_{f2,l}$ can be derived from Equation 7 as follows:

$$n_{f2,l} = \frac{4 X_f v_t V_{f,l}}{\pi (1+X_f) d_f^2 l_f} \quad (9)$$

The projected surface area of a cylindrical fiber is equal to the product of its length and diameter. Therefore, the total projected surface area of all fibers in layer 1, $s_{f1,l}^P$ can be derived as:

$$s_{f1,l}^P = n_{f1,l} * d_f * l_f = \frac{4 v_t V_{f,l}}{\pi (1+X_f) d_f} \quad (10)$$

Similarly, the total projected surface area of fibers in layer 2, $s_{f2,l}^P$ can be derived as:

$$s_{f2,l}^P = n_{f2,l} * d_f * l_f = \frac{4 X_f v_t V_{f,l}}{\pi (1+X_f) d_f} \quad (11)$$

The projected surface area of slurry layer, $s_{s,l}^P$ can be written as:

$$S_{s,l}^P = \frac{v_{s,l}}{t_{s,l}} = \frac{v_t}{t_l} \quad (12)$$

Projected fiber surface area fraction of fiber layer 1, $S_{f1,I}^P$ is defined as follows:

$$S_{f1,I}^P = \frac{\text{Projected surface area of all fibers in layer 1, } s_{f1,I}^P}{\text{Projected surface area of the slurry layer, } s_{s,I}^P} \quad (13)$$

Combining Equations 10 and 12, the projected fiber surface area fraction of fiber layer 1, $S_{f1,I}^P$ can be derived as:

$$S_{f1,I}^P = \frac{4V_{f,I}t_I}{\pi(1+X_f)d_f} \quad (14)$$

Similarly, combining Equations 11 and 12, the projected fiber surface area fraction of fiber layer 2, $S_{f2,I}^P$ can be derived as:

$$S_{f2,I}^P = \frac{4X_f V_{f,I}t_I}{\pi(1+X_f)d_f} \quad (15)$$

Equations 14 and 15 depict dependence of the parameter projected fiber surface area fraction, $S_{f1,I}^P$ and $S_{f2,I}^P$ on several other variables in addition to the variable total fiber volume fraction, $V_{f,I}$. These variables are diameter of fiber strand, thickness of discrete slurry layer, and the amount (proportion) of fibers in the individual discrete fiber layers.

Experimental observations confirm that the embedment efficiency of a layer of fiber network laid over a cementitious slurry layer is a function of the parameter "projected fiber surface area fraction". It has been found that the smaller the projected fiber surface area fraction, the easier it is to embed the fiber layer into the slurry layer. The reason for good fiber embedment efficiency can be explained by the fact that the extent of open area or porosity in a layer of fiber network increases with decreases in the projected fiber surface area fraction. With more open area available, the slurry penetration through the layer of fiber network is augmented, which translates into enhanced fiber embedment efficiency.

Accordingly, to achieve good fiber embedment efficiency, the objective function becomes keeping the fiber surface area fraction below a certain critical value. It is noteworthy that by varying one or more variables appearing in the Equation 15, the projected fiber surface area fraction can be tailored to achieve good fiber embedment efficiency.

Different variables that affect the magnitude of projected fiber surface area fraction are identified and approaches have been suggested to tailor the magnitude of "projected fiber surface area fraction" to achieve good fiber embedment efficiency. These approaches involve varying one or more of the following variables to keep projected fiber surface area fraction below a critical threshold value: number of distinct fiber and slurry layers, thickness of distinct slurry layers and diameter of fiber strand.

Based on this fundamental work, the preferred magnitudes of the projected fiber surface area fraction $S_{f1,I}^P$ have been discovered to be as follows:

| | |
|---|---|
| Preferred projected fiber surface area fraction, $S_{f1,I}^P$ | <0.65 |
| Most preferred projected fiber surface area fraction, $S_{f1,I}^P$ | <0.45 |

For a design panel fiber volume fraction, $V_f$, for example a percentage fiber volume content in each slurry layer of 1-5%, achievement of the aforementioned preferred magnitudes of projected fiber surface area fraction can be made possible by tailoring one or more of the following variables—total number of distinct fiber layers, thickness of distinct slurry layers and fiber strand diameter. In particular, the desirable ranges for these variables that lead to the preferred magnitudes of projected fiber surface area fraction are as follows:

Thickness of Distinct Slurry Layers, $t_{s,I}$

| | |
|---|---|
| Preferred thickness of distinct slurry layers, $t_{s,I}$ | ≤0.35 inches |
| More Preferred thickness of distinct slurry layers, $t_{s,I}$ | ≤0.25 inches |
| Most preferred thickness of distinct slurry layers, $t_{s,I}$ | ≤0.15 inches |

Fiber Strand Diameter, $d_f$

| | |
|---|---|
| Preferred fiber strand diameter, $d_f$ | ≥30 tex |
| Most preferred fiber strand diameter, $d_f$ | ≥70 tex |

EXAMPLES

Example 1

The process of co-pending U.S. patent application Ser. No. 11/655,647 was run using the basic production line 130 shown in FIG. 8 with the only modification from the process in the co-pending application being the use of the headbox 44 of the present invention in place of the slurry feeds system described in the co-pending application. The cements portion of the slurry comprises 65 wt. % Calcium sulfate alpha hemihydrate, 22 wt. % Type III Portland cement, 12 wt. % Silica Fume, and 1 wt. % hydrated lime. The liquid portion of the slurry comprises 99.19 wt. % water and 0.81 wt. % ADVA-CAST superplasticizer by W.R. Grace and Co. The liquid:cement weight ratio was 0.55 and the Aggregate (EXTEN-DOSPHERES SG microspheres):Cement weight ratio was 0.445.

The slurry was produced according to the present process, using the present system, and is shown to have four slurry layers, 77, 80, 88 and 90, as shown in FIG. 2. This panel should be considered exemplary only in that a panel 92 produced under the present system may have one or more layers. By using the above mathematical relationships, the slurry layers 77, 80, 88 and 90 can have different fiber volume fractions. For example, skin or face layers 77, 90 have a designated fiber volume fraction $V_f$ of 5%, while inner layers 80, 88 have a designated $V_f$ of 2%. This provides a panel with enhanced outer strength, and an inner core with comparatively less strength, which may be desirable in certain applications, or to conserve fibers for cost reasons. It is contemplated that the fiber volume fraction $V_f$ may vary among the layers 77, 80, 88, 90 to suit the application, as can the number of layers.

Also, modifications of the fiber content can be accomplished within each slurry layer. For example, with a fiber volume fraction $V_f$ of 5%, for example, fiber layer 1 optionally has a designated slurry volume fraction of 3% and fiber layer 2 optionally has a designated fiber volume fraction of 2%. Thus, $X_f$ will be 3/2.

The slurry feed to the headbox 44 through hose 390 was fed at the same feed rate of about 1.15 cubic feet per minute for each hose, although the workable range can be from about 0.5 to 2.5 cubic feet per minute. The slurry reciprocating trolley reciprocates transversely across the headbox at a rate of about 20 times per minute, which is approximately 1.5 times the reciprocating rate of the prior art process to ensure even distribution throughout the headbox in view of the lower slurry volume maintained in the headbox of the present invention. If desired, the rate the slurry reciprocating trolley traverses across the headbox can be increased to about 30 to 40 trips to allow for a slurry feed rate of about 2.5-3.5 cubic feet per minute and travelling web line speeds of up to 50 ft. per minute. The headbox of the present invention is about 5 inches wide by 50 inches long by about 0.25 inches deep, for a headbox capacity of about 62.5 cubic inches of slurry. The width of the headbox can be varies by plus or minus 1.0 inch and the slurry depth can vary between about 0.125 to 0.500 inches. In comparison, the headbox used in the prior art headbox could range from 1 to 2 gallons (231 to 462 cubic inches). The headbox was vibrated at a rate of about 12,000 vibrations per minute or more to minimize the effect of consistency variations in the slurry. The flow of the slurry from the hose 390 is directed to the rear portion of the headbox near wall 370 to cause previously deposited slurry to flow out of the headbox and down the slurry spillway 380. This promotes flow characteristics in the headbox of last in first out which discourages stagnation of the slurry in the headbox. The line speed of the production line can be from as low as 5 ft./minute to about 35 ft./minute, more typically between 7-35 ft./minute with a rate of deposit of the slurry into the headbox of from about 0.35-2.5 cubic feet/minute more typically 0.5-2.5 cubic ft./minute while maintaining a continuous curtain of slurry deposited on the web.

The reciprocating feed for the slurry being deposited in the headbox traverses the length of the headbox between about 10 to 40 times per minute, and more typically between about 20 to 30 times per minute when the flow rate of the slurry is about 1.5 to 2.5 cubic feet per minute.

If the line speed is increased to about 35-50 ft/minute, the times the feed traverse the length of the headbox could be increased to the upper limits of the range of 30-40 times per minute for a flow rate of about 2.5-3.5 cubic ft./min.

The line speed can be reduced to a low as 5 feet per minute or increased to as much as 50 feet per minute with the present headbox without adversely effecting the consistency of the slurry curtain being deposited from the spillway of the headbox on the web. This is a particular improvement over the prior art headbox designs which could not provide a consistent slurry curtain at a slurry flow rate of about 2.5 to about 3.5 cubic ft./minute when the line speed of up to about 50 feet per minute. In the prior art headbox, the speed of rotation of the rollers in the headbox has to be increased significantly to handle a slurry flow rate of above about 2.5 cubic ft./minute. This results in the slurry flowing over the top and sides of the headbox and being deposited on the travelling web by gravity. This does not produce for deposit of a consistent curtain of slurry on to the travelling web.

Panels were manufactured using the system of FIG. 8 and using the above-described projected fiber surface area fraction formula from the above-described slurry composition. Panel thickness ranged from 0.5 to 0.82 inches. Individual slurry layer thicknesses ranged from 0.125 to 0.205. Total fiber volume fraction $V_f$ ranged from 2.75-4.05%.

While a particular embodiment of the present slurry feed apparatus for fiber-reinforced structural cementitious panel production has been shown and described, it will be appreciated by those skilled in the art that changes and modifications may be made thereto without departing from the invention in its broader aspects and as set forth in the following claims.

What is claimed is:

1. A slurry feed apparatus for depositing a slurry upon a moving forming web having a direction of travel, comprising:

a headbox mounted transverse to the direction of travel of the moving forming web, having a horizontal bottom surface and a spillway which is downwardly inclined from a front lip of the headbox and the spillway for directing slurry from the horizontal bottom surface of the headbox over the front lip and down the inclined surface of the spillway onto the moving forming web;

vertical edge boards, comprising a headbox back edge board opposed to the front lip of the spillway and the headbox and two opposed headbox side edgeboards, on three respective sides of the headbox are positioned to permit build-up of slurry on the horizontal bottom surface of the headbox and prevent slurry from spilling over the sides and back of the headbox;

pivot pins mounted on the outer surface of the two opposed headbox side edge boards for mounting the headbox on respective opposed side walls of a conveyor for the moving forming web through use of vertically adjusted open yokes with means for adjusting a tilt angle of the headbox up and down as well as side to side to control the flow of slurry down said spillway;

a vibrator mounted on the outer surface of at least one of the vertical edge boards of the headbox for vibrating the headbox;

a reciprocating slurry delivery mechanism constructed and arranged for providing slurry to the headbox; and wherein the inclined spillway is positioned to be above the moving forming web but not to be in contact with the slurry on the moving forming web.

2. The apparatus of claim 1, further comprising means for manually tilting the headbox while it is in the open yoke for adjusting the flow of slurry out of the headbox down the spillway to the moving forming web.

3. The apparatus of claim 1, wherein the sidewalls and the spillway form are made of a non-stick material.

4. The apparatus of claim 1, wherein the spillway is orientated to allow the flow of the slurry from the headbox to direct a continuous flow of slurry to within 1.0 in. to 1.5 in. of the uppermost portion of said at least one fiberglass layer on the moving forming web.

5. The apparatus of claim 1, wherein the reciprocating slurry delivery mechanism includes a conduit connected to a source of slurry and having an end in close proximity to the inside surface of the headbox, the conduit end being engaged in a reciprocating mechanism which laterally reciprocates the conduit end between ends of the headbox.

6. The apparatus of claim 1, wherein the headbox is oriented to build up a reservoir of slurry between the bottom horizontal surface of the headbox, the vertical sides of the headbox and the front lip of the spillway before the slurry flows from the headbox over the front lip and onto the spillway.

7. The apparatus of claim 1, wherein the headbox is pivotally mounted in yokes attached to the sidewalls of a production line carrying the moving forming web, further including an adjustment system for adjusting the position of the headbox, the adjustment system comprising:

a first pivot pin functionally connected to one side of the headbox, a second pivot pin connected to the opposed sidewalls of the slurry headbox.

8. The apparatus of claim 1, wherein the headbox is designed to hold slurry at a depth of between 0.125-0.5 inches.

* * * * *